No. 615,670. Patented Dec. 13, 1898.
W. BLAIR.
INFLATING NIPPLE FOR PNEUMATIC TIRES.
(Application filed Dec. 13, 1897.)
(No Model.)
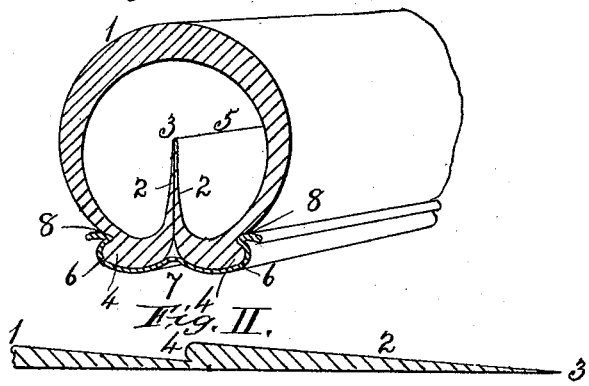
Fig. I.
Fig. II.
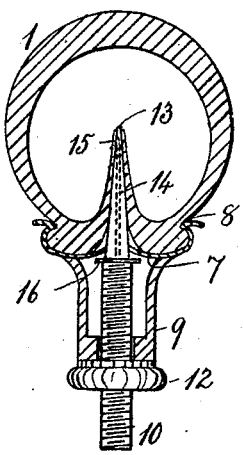
Fig. IV.
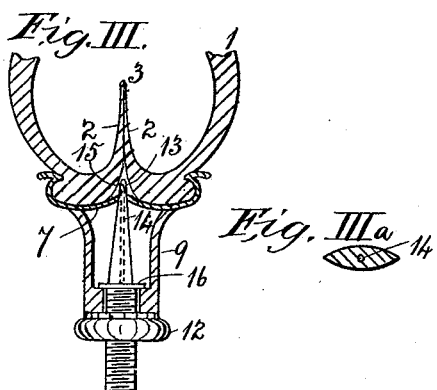
Fig. III.
Fig. IIIa.
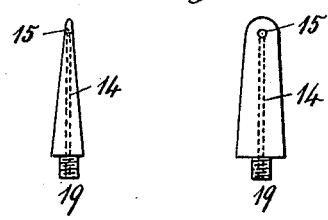
Fig. VIII. Fig. IX.
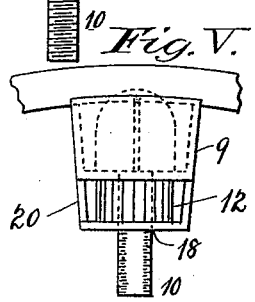
Fig. V.
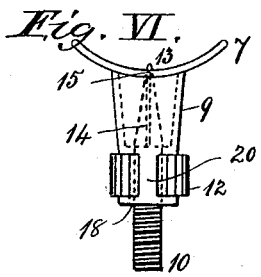
Fig. VI.
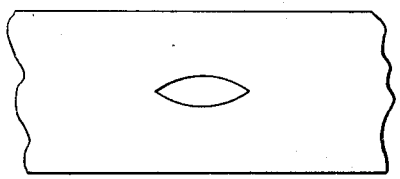
Fig. Va.
Fig. VII.
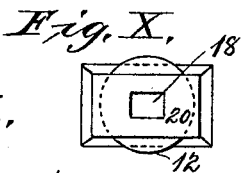
Fig. X.
Witnesses. H. F. While
H. P. Doolittle
Inventor William Blair
By M. H. Doolittle & Son
Attorneys.
THE NORRIS PETERS CO., PHOTO-LITHO., WASHINGTON, D. C.

United States Patent Office.

WILLIAM BLAIR, OF LONGTON, ENGLAND.

INFLATING-NIPPLE FOR PNEUMATIC TIRES.

SPECIFICATION forming part of Letters Patent No. 615,670, dated December 13, 1898.

Application filed December 13, 1897. Serial No. 661,628. (No model.)

*To all whom it may concern:*

Be it known that I, WILLIAM BLAIR, a subject of the Queen of Great Britain, residing at Longton, in the county of Stafford, England, have invented certain new and useful improvements in pneumatic tires, in inflating-nipples for pneumatic tires, and in nozzles for inflating-pumps for use with pneumatic tires, of which the following is a specification.

My invention relates to pneumatic tires of the so-called "tubeless" type, to inflating-nipples especially, though not exclusively, adapted for use with my pneumatic tires, and to nozzles resembling the said nipples, but adapted for attachment to inflating-pumps.

In order that my invention may be readily understood, I shall proceed to describe it with reference to the accompanying drawings, in which—

Figure I shows, partly in section and partly in elevation, a severed portion of a tire constructed under my invention placed in operative position upon a wheel-rim. Fig. II illustrates a part of my tire opened out into its flat or band-like position and showing the form of the tapered lash 2. Fig. III represents an inflating-nipple in its withdrawn position. Fig. III$^a$ is a cross-section of the point of the said nipple, the said section being made near the base of the point of the nipple or close to the shank. Fig. IV shows the same parts as are illustrated in Fig. III, but with the nipple in its protruding position—that is to say, the position that it occupies during inflation. Fig. V is a side elevation of another form of inflating-nipple. Fig. V$^a$ is a cross-section of the shank shown in Fig. V. Fig. VI is an end elevation of the form of inflating-nipple shown in Fig. V. Fig. VII is a plan view of a portion of a rim with an orifice therein adapted for the passage of the point of an inflating-nipple or the nozzle of an inflating-pump. Figs. VIII and IX are respectively an end elevation and a side elevation of an inflating-nozzle constructed under my invention for attachment to an inflating-pump. Fig. X is an underneath plan view of cup and frame of Figs. V and VI.

In the figures similar numerals of reference indicate similar or equivalent parts.

My tire when placed in operative position, as shown in Fig. I, consists of an annular tube 1 of rubber (with or without canvas insertion) or of other material used for the manufacture of such tires. When straightened out into the form of a band, the edges are seen (see Fig. II) to consist of a tapering lash 2, coming to a fine edge at the border 3 and thickening to the heel 4. When bent into operative position, as shown in Fig. I, the lashes meet together, contact taking place between the edges of the said lashes along the annular line 5 and extending for some distance over the contiguous surfaces of the lashes, while the heels 4 nest in the recesses 6 of the rim 7. It will be seen that when the tire is inflated the lips or lashes 2 are pressed tightly against one another, so that the greater the air-pressure the tighter do the lips press against one another and the more efficient is the seal obtained. At the same time the air-pressure forces the heels 4 tightly into the recesses 6 of the rim, so as to maintain the tire in position on the wheel. I prefer to have the lashes or lips of soft elastic rubber, so as to insure good contact.

The lashes or lips 3 are formed integrally with the band constituting the tire and normally lie out straight and flat, even with the surface of the band when the latter is unfolded and open, and when the lips are brought together, with their outer surfaces in contact, they are held closely in contact by the strong resistance of the normal direction of pressure of the lips. Thus it is of the essence of my invention that the lips or lashes should taper to a more or less fine edge and that the lips should press against one another instead of overlapping, and, further, that they should meet not by simple abutment, as in certain forms of tube, but by what I may term "pressure of deflection"—that is to say, when placed in operative position they should be deflected out of their normal position or curved, so that there is a constant strain thrown upon them to keep them in contact irrespective of the contact pressure exerted by the air-pressure due to inflation and irrespective of the forcing together of the lips by inserting them between confining edges 8 of the rim or an equivalent (such as inextensible wires fulfilling the same function as the edges 8) device. By such means the lips are held together and the tire kept air-tight even when the air-pressure is somewhat reduced.

In the event of punctures or the like taking place the tire is easily repaired by first deflating the tube and then turning it inside out, so as to expose the injured part for repairing manipulation.

My improved inflating-nipple adapted to be used with my tire and carried by the rim of the wheel is illustrated in Figs. III, III$^a$, IV, V, V$^a$, and VI, the form illustrated in Figs. V and VI being different from that in Figs. III and IV.

Referring now to Figs. III, III$^a$, and IV, 9 is a cup attached in any convenient manner to the rim 7, the said cup being designed for the support of the inflating-nipple. The said nipple consists in part of a shank 10, having a male thread cut thereon, the said thread being designed, in so far as the part at the free extremity of the shank is concerned, for engagement with the female thread of an ordinary inflating-pump, the remainder of the said male thread being adapted for engagement with the nut 12, hereinafter to be described. At the other end of the said shank is the "point" 13, consisting of a tapered piece having an air-passage 14, whose orifice 15 is situated at or near the extremity of the point. The said point, as will be seen from the drawings, is flattened, so as to present in cross-section the form of a flattish ellipse, as shown in Fig. III$^a$. At the part where the shank joins the point is the shoulder 16, which is designed to prevent the inflating-nozzle dropping out of the cup 9. The milled nut 12 is designed to retain the inflating-nipple in its withdrawn position when the pump is no longer being used. The action of this part of my invention is as follows: Let us assume that the parts are in the position shown in Fig. III and that it is desired to inflate the tire. The milled nut 12 is turned in the loosening direction, and thereafter the inflating-nipple is pushed upward, so that the point 13 is forced between the lips 2 into the position shown in Fig. IV. The orifice 15 is now within the air-space of the tire and the latter can be inflated by means of the pump. As soon as sufficient pressure has been obtained within the tire the milled nut 12, which is now in the position shown in Fig. IV, is turned in the tightening direction, the effect of which is to withdraw the point from the air-space of the tire and bring the parts back to the position shown in Fig. III, the lips 2 closing up in an air-tight manner. I prefer to have the orifice 15 at the side of the point, so that as soon as the said nozzle has been sufficiently withdrawn the said orifice is closed up by the rubber of one of the lips 2 and the air will no longer escape. The orifice may, however, be placed with efficiency at the extremity of the point.

It will be seen from what has preceded that the inflating-nipple does not in itself constitute an inflating-valve. The tire itself constitutes a part of the valve, or to be perhaps more accurate a part of the said tire constitutes the movable part or flap, so to speak, of the said valve, the point constituting the seating of the said valve.

In Figs. V, V$^a$, and VI, I show a modification of the said form of inflating-nipple. In this form 9 is the cup, as before, and 20 is a rectangular frame or bracket designed to retain the milled nut 12 in position. In this case the shank 10 has flats 17 cut upon it, (see Fig. V$^a$,) and instead of passing through an annular orifice in the frame 20 it passes through a rectangular orifice 18. The reason why the orifice 18 is not circular and the shank flattened is to prevent the nipple turning when the milled nut 12 is rotated, it being important that the major axis of the point should be parallel or approximately parallel with the contact-line 5, (see Fig. I,) so as to prevent escape of air when the nipple is protruded toward or into the tire. In this form of my invention—that is to say, in the form illustrated in Figs. V, V$^a$, and VI—the nipple is both protruded and withdrawn by turning the milled nut in an annular direction in the loosening direction when it is desired to inflate and in the tightening direction when it is desired to move the point from the tire after inflation.

In Fig. VII, I illustrate in plan the orifice in the rim through which the point may be thrust or withdrawn.

When it is desired to deflate the tire for the purpose of removing it from the rim or otherwise, all that is necessary to be done is to protrude the nipple into the air-space of the tire until the orifice 15 is no longer closed by the lips 2, when the air will escape readily through the air-passage.

I may provide an inflating-pump of any of the usual forms, with a nozzle similar to the point of the nipple hereinbefore mentioned. This is illustrated in Figs. VIII and IX, where it will be seen that the nozzle is similar to the point shown in Figs. III, III$^a$, IV, V, and VI. This nozzle, however, instead of being integral with or attached to a shank 10, is attached to an inflating-pump in any convenient manner. In Figs. VIII and IX I show a thread on the portion 19, adapted for attachment to the inflating-pump; but any means of attachment may be employed, if preferred. In this case when it is desired to inflate the tire all that has to be done is to thrust the point of the nozzle through an orifice made for the purpose in the rim and up between the lips into the central space of the tire. When by operating the pump the tire is sufficiently inflated, the nozzle is now pulled out, when the lips close up and retain the air, as before mentioned.

I desire it to be understood that for the purposes of my claims I employ the term "valve" in the generic sense which I believe to be common among mechanical engineers and meaning the combination of a fixed part and a movable part, the fixed part being typified by the seating of an ordinary valve and the movable part by the flap of an ordinary valve.

The orifice in the rim shown in Fig. VII may be closed or covered over in any convenient desired manner for the purpose of excluding dirt or grit from the tire.

I have hereinbefore specified the inflating-nipple as being supported by a cup 9. Instead of such a cup a mere bracket or frame might be employed; but I prefer to use a cup for the purpose of excluding dirt and grit.

I desire it to be understood that I do not limit myself to the particular forms (nipple, nozzle, or point) of inflating device set forth. Any form adapted for protrusion into the air-space of a tire for inflating purposes and for withdrawal therefrom after inflation, the said inflating device serving as one of the elements of a valve and fulfilling the functions of the seating thereof, will answer my purpose.

What I claim as my invention, and desire to secure by Letters Patent, is—

In an inflating device for pneumatic tires, in combination with the rim, a cup attached to said rim, a threaded socket in said cup, a threaded hollow shank engaging said socket, an inflating-point secured to said shank, a tire which said point is adapted to enter, means to hold said shank in said cup and means to adjust said shank, and an inflating-pump to engage said shank, substantially as described.

In testimony whereof I have hereunto set my hand, this 5th day of November, 1897, in the presence of the two subscribing witnesses.

WILLIAM BLAIR.

Witnesses:
CHARLES GARLAND,
HARRY PERRY.